June 13, 1950 H. E. GOLDSTINE 2,511,204

FREQUENCY SHIFT KEYING CHANNELING

Filed Jan. 8, 1948 3 Sheets-Sheet 1

INVENTOR.
Hallan E. Goldstine
BY
Harry Tunick
ATTORNEY

INVENTOR.
Hallan E. Goldstine
BY
Harry Tunick
ATTORNEY

June 13, 1950 H. E. GOLDSTINE 2,511,204

FREQUENCY SHIFT KEYING CHANNELING

Filed Jan. 8, 1948 3 Sheets-Sheet 3

INVENTOR.
Hallan E. Goldstine
BY
Harry Tunick
ATTORNEY

Patented June 13, 1950 2,511,204

UNITED STATES PATENT OFFICE 2,511,204

FREQUENCY SHIFT KEYING CHANNELING

Hallan E. Goldstine, Port Jefferson, N. Y., assignor to Radio Corporation of America, a corporation of Delaware Application January 8, 1948, Serial No. 1,242

3 Claims. (Cl. 250—9)

This application concerns radio signalling systems wherein a plurality of signal transmitters are to operate on adjacent channels.

The purpose of my invention is to provide better relative frequency stability between the said transmitter channels. When this purpose is attained, the transmitter channel spacing can be reduced without interference between channels taking place. A number of transmitters can operate in a closely spaced band and the shift of each can be independent, so that the same or different keying signals can be utilized. The frequencies can be preset to their operating frequency before the transmitters go "on the air." Thus, a great saving in the total width of the frequency spectrum used is made and this is of first importance at the present time when the frequency spectrum in use is already crowded.

In describing my invention in detail, reference will be made to the attached drawings wherein, Fig. 1 illustrates by block diagram and line connection a multiple channel system arranged in accordance with my invention.

Fig. 2 is a modification of the arrangement of Fig. 1, while

Figure 1:
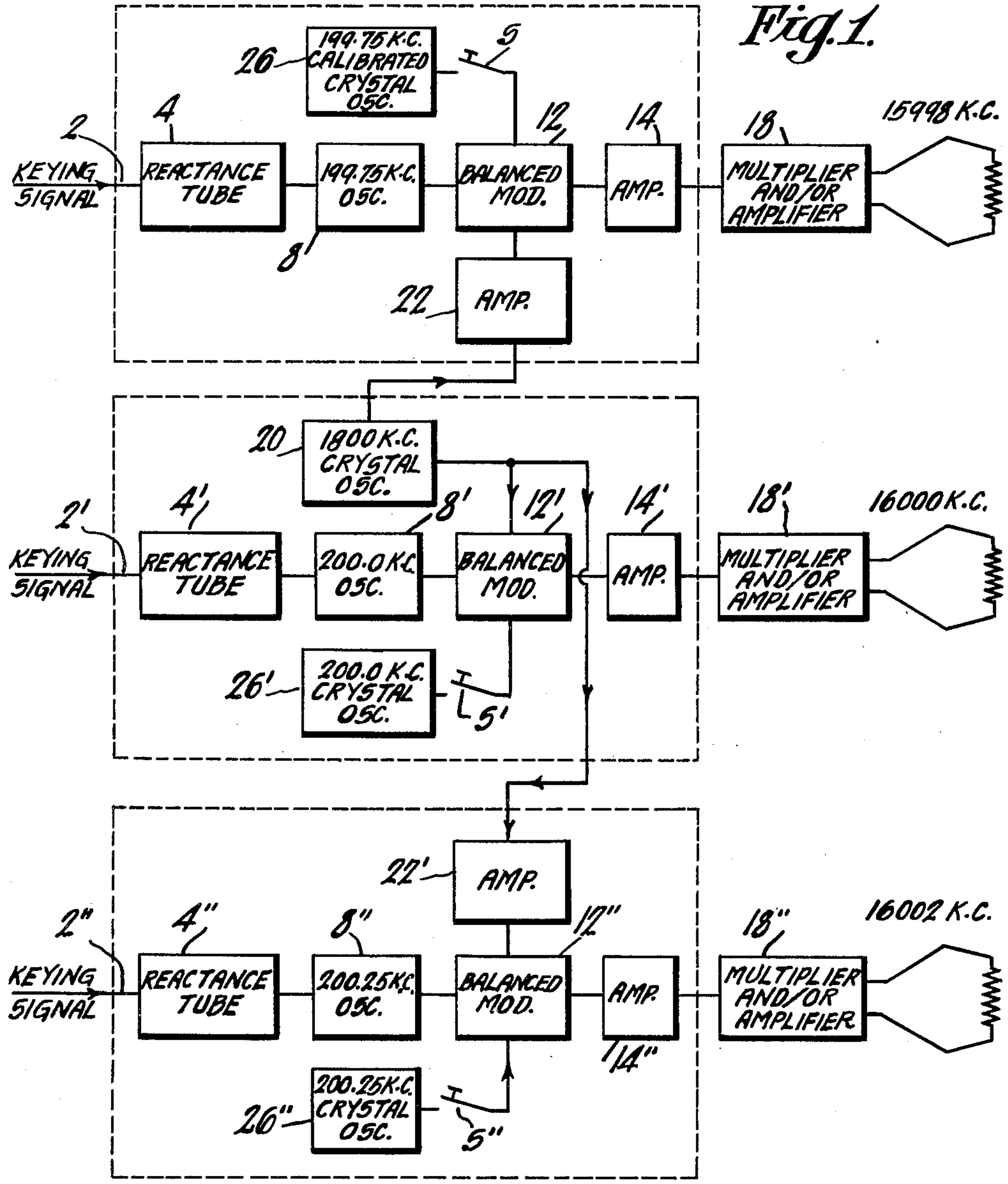

To illustrate the principles of my invention, it is assumed that the transmitters are equipments with frequency shift keying units similar to those used by my assignee. The frequency shift keying units are hereinafter referred to as FSK units and these units generate oscillatory energy, the frequency of which is shifted the desired amount back and forth between two selected frequencies, one representing "space," the other "mark." The signals may be then assumed to be coming in on lines 2, 2′ and 2″ and may be keyed tone or direct current which varies in magnitude between two values, one representing "mark," the other "space." The keying signals are applied to reactance tubes 4, 4′ and 4″ to control the tube reactances in a well known manner. The tube reactances may be as disclosed in Crosby U. S. Patent #2,279,659, dated April 14, 1942. The reactance tubes are associated with or included in frequency determining circuits of the oscillation generators 8, 8′ and 8″ to shift the frequency of the oscillatory energy generated therein in accordance with the signals. This apparatus may be substantially as described in my U. S. application Serial #644,147, filed January 29, 1946, and the same will not be illustrated in detail here. Said application has now ripened into Patent No. 2,492,795, dated December 27, 1949.

In the embodiment being described and in order to make the description as clear as possible, I have assigned frequencies to be used in the several stages of the several transmitters and in the description, will refer to such frequencies. However, it will be understood that other frequencies may be used as desired merely by changing the circuit tuning and/or the stabilizing crystals used in the circuits. The oscillations generated in 8 are assumed to be of a mean frequency equal to 199.75 kc. The output from 8 then is at 199.75 kc. ± the frequency shift FS which might be of the order of ±400 cycles per second or a total of 800 cycles more or less. The generator in 8′ is assumed to have a frequency of 200 kc. so that its output is at 200 kc. ±FS while the generator at 8″ is assumed to operate at 200.25 kc. so that its output is at a frequency equal to 200.25 kc. ±FS.

These outputs are supplied to carrier suppressor modulators 12, 12′ and 12″. The carrier suppressor modulators may be balanced modulators and then the outputs from units 8, 8′ and 8″ are applied differentially to the modulator tubes in the balanced modulators. These moduators 12 and 12′ are each excited by oscillatory energy of relatively high frequency supplied from a common source 20. This source 20 may be conventional and may comprise a crystal oscillator of high order frequency stability or the same with frequency multipliers if necessary. Buffer amplifiers 22 and 22′ are interposed between the crystal oscillator and two of the channels for isolation purposes. Where the modulators in 12, 12′ and 12″ are of the type known as carrier suppressor or balanced modulators, then the high frequency oscillations from source 20 are applied cophasally to the pair of tubes in each modulator so that these voltages when amplified, oppose and cancel to suppress the carrier.

A side band, usually the upper side band, is selected from the output of each of the modulators 12, 12′ and 12″. This upper side band becomes the output signal, which is further amplified and multiplied. As an example, if the crystal oscillator 20 is 1800 kc. and the low frequency oscillator 8′ is 200 kc. $\pm f$ shift, then the upper side band selected is 2000 kc. $\pm f$ shift, then it is multiplied 8 times, output frequency—16,000 kc. $\pm 8f$ shift. If the frequency shift at the output is 800 cycles, then the shift at 200 kc. is 100 cycles. The selected side bands are fed to selective amplifiers 14, 14' and 14''. These amplifiers each include the tuned circuits necessary for selecting a side band and the selected side band is then fed from the amplifiers to multipliers and/or additional amplifiers 18, 18' and 18'' where further amplification takes place if necessary and the frequency is multiplied as desired. Separate antennas are connected to each of the amplifiers 18, 18' and 18''.

As a numerical example, suppose that we are operating three channels on FSK of 16,000 kc., 16,002 kc., and 15,998 kc. The center frequency of 16,000 kc. is multiplied 8 times and the crystal frequency would thus be found from the expression $8(xtal+200)=16,000$ and would be 1800 kc. The carrier crystal frequency is combined with the 200 kc. frequency modulated oscillator to produce a 2000 kc. output which, when multiplied 8 times, gives the output frequency of 16,000 kc. The other oscillators would be tuned slightly above and below 200 kc. and one other frequency would be $8(1800+X)=16,002$, $X=200.250$ kc. and the other frequency would be $8(1800+X)=15,998$, $X=199.750$ kc.

There are provided calibrating crystals preset to 200.250 kc., 200.00 kc., and 199.750 kc. to set the oscillators to exact frequency.

The master crystal oscillator may be operated in one of the FSK units and the R. F. fed to the other units.

Of course, other frequencies than those described here may be used, also the beat frequency between the 200 kc. oscillator and the ones above and below may be utilized for setting up on correct frequency spacing.

It is necessary, of course, to have the oscillators 8, 8' and 8'' operating at the exact frequency desired and to do this, I supply separate monitoring oscillators 26, 26' and 26'' for each of the balanced modulators 12, 12' and 12''. The oscillators 26, 26' and 26'' are of constant frequency being, for example, crystal controlled oscillators and are calibrated to operate at exact known frequencies.

Figure 3:
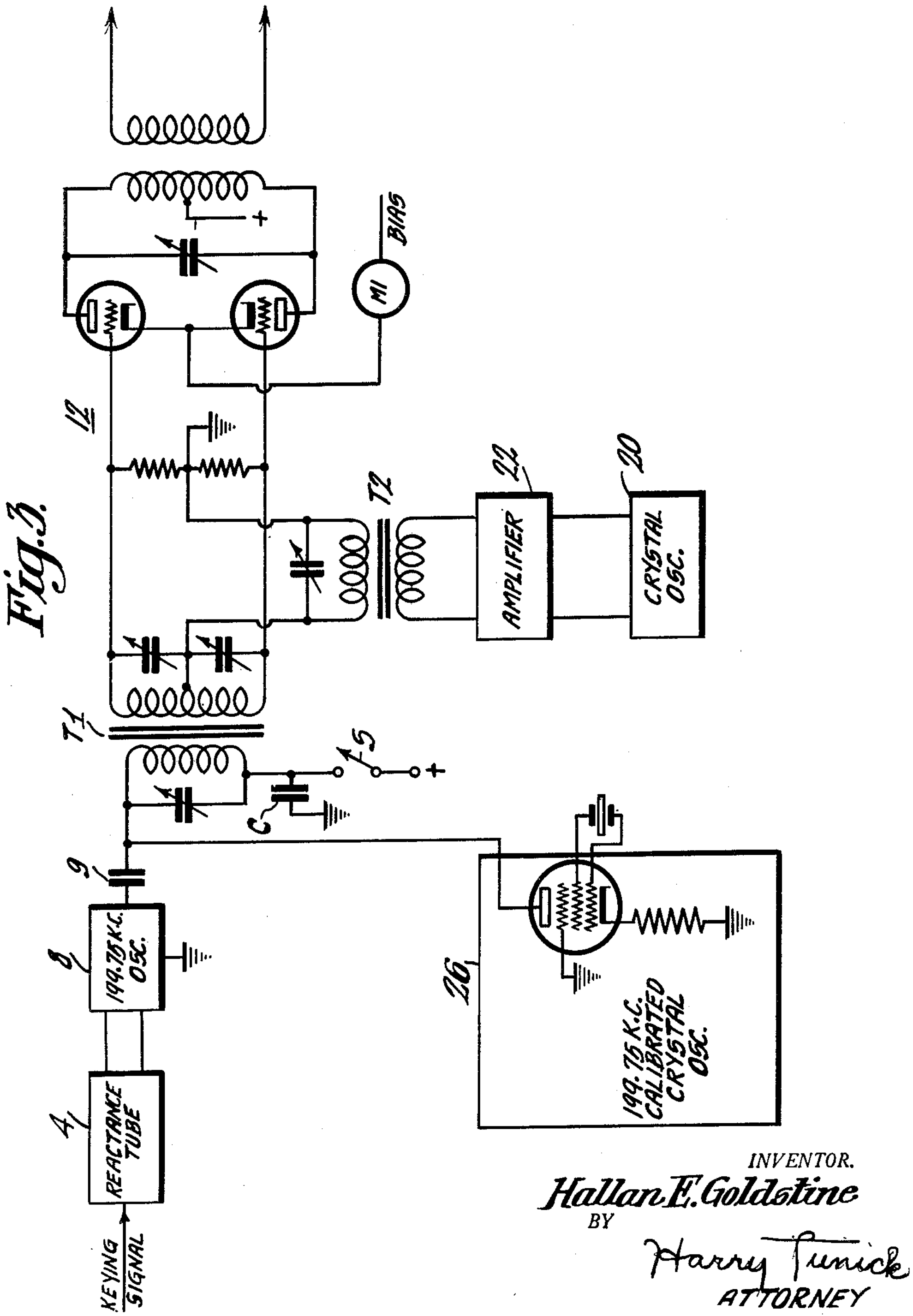
Fig. 3 illustrates details of the several carrier suppressor modulators of the prior embodiments and their connections in the circuits and to the monitoring oscillator.

To calibrate the oscillators 8, 8' and 8'', an arrangement as illustrated in Fig. 3 may be used. Since the several calibrating means are the same, a single means has been shown in Fig. 3. The balanced modulator 12 then may be as illustrated in general in Fig. 3 and may comprise a differential or push-pull input including transformer T1 and a co-phasal input comprising transformer T2. The transformer T2 may be coupled to the crystal oscillator 20 by the amplifier 22. The transformer T1 has its primary winding coupled to the output of the frequency shifted oscillator 8 by a condenser 9 and this alternating current circuit is completed through condenser C. The primary winding of the transformer T1 is also coupled to an output electrode of the calibrated crystal oscillator 26 and when the switch S is closed, this oscillator is supplied with operating potentials and generates oscillations which appear in the transformer T1 primary and are fed to the control grids of the tubes in the modulator 12. To make the calibration, the frequency of the oscillator 8 is adjusted for approximately zero beat note with oscillations from source 26 in the modulator 12. For this adjustment, the transmitter need not be "on the air." The intensity of the current flowing in the milliammeter M1 included in the cathode return circuits of the balanced modulator tubes indicates the low frequency beat, this in turn being an indication that the oscillator 8 is at a center frequency equal to the frequency of the calibrated crystal oscillator 26. When this nearly zero beat note condition exists, slowly varying current flows in the meter M1. The calibrating apparatus here is substantially as shown in my above mentioned U. S. application.

Figure 2:
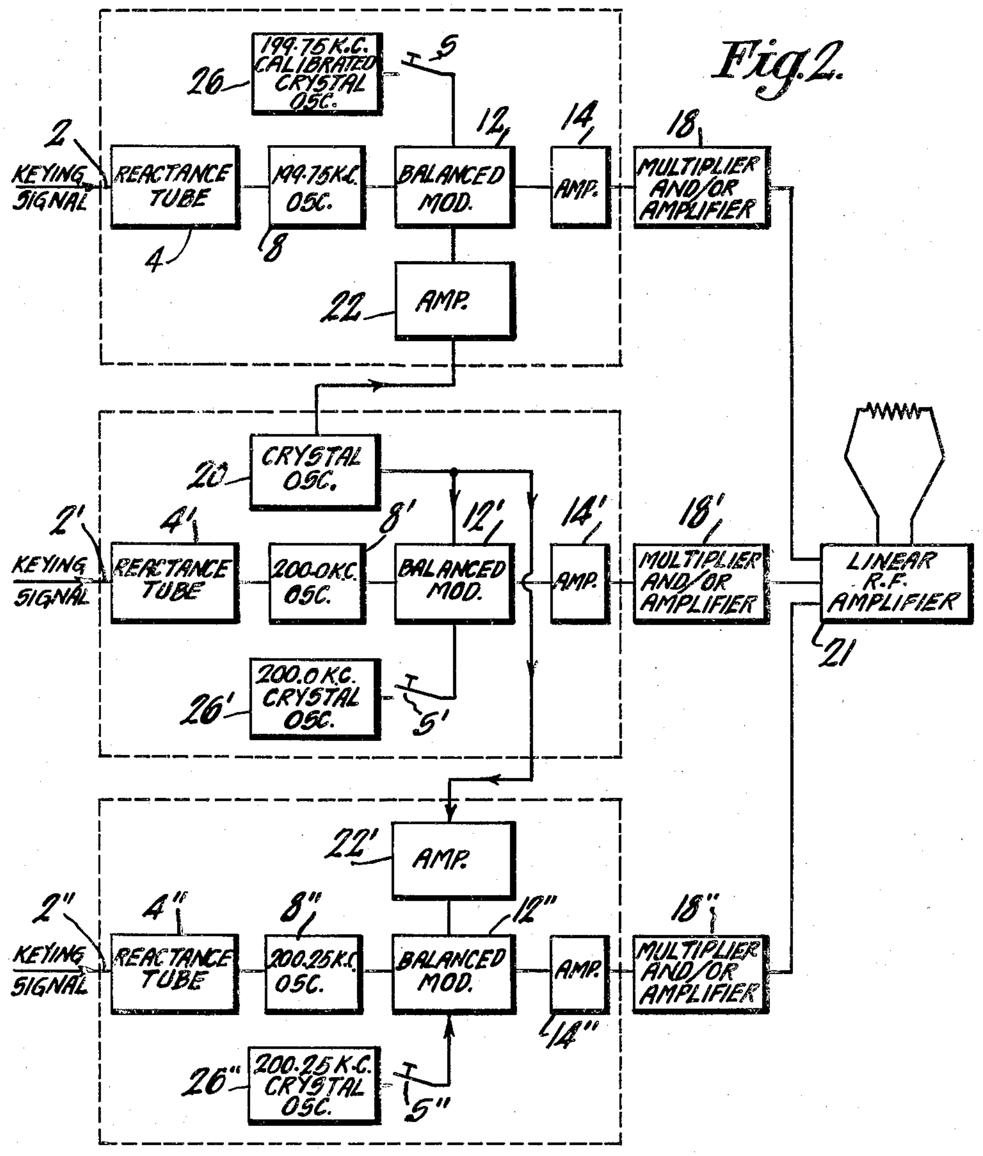

In the embodiment of Fig. 1, separate antenna systems are used for each transmitted frequency. In the modification of Fig. 2, a common antenna is used. Then all of the multiplier and/or amplifiers 18, 18' and 18'' are coupled to a linear radio frequency amplifier 21 which in turn is coupled to the common antenna system. The antenna system has a response characteristic sufficiently broad to handle uniformly the frequencies involved. The final amplifier stage 21 is so operated that the instantaneous plate voltage does not go to zero. Then cross modulation is very small. The driver stage to the amplifier is so designed that the plate current supplied by the tube is essentially independent of the plate voltage. A tetrode or pentode has this characteristic and may be suitable for this application. However, if a tube were available to provide high efficiency at relatively high instantaneous plate voltage, then higher efficiencies might be obtained in the individual output stages. The present screen grid tetrodes may be operated as described above, with reduced power output (from maximum class C operation) at relatively lower efficiency. However, the reduction of efficiency with the attendant increased input power may be offset by the advantages gained in having the transmitters operate on one antenna.

What is claimed is:

1. In a multiplex signalling system, in combination, a plurality of signal sources, a source of oscillatory energy, the frequency of which may be shifted, for each signal source, a reactance tube modulator associated with each signal source and with the corresponding source of oscillations for shifting the frequency of the said oscillations in accordance with signals, a tube modulator coupled to each of said sources, a source of oscillatory energy of relatively high and substantially fixed frequency coupled to all of said last named modulators, a utilization circuit coupled to each of said last named modulators and means for monitoring said first named sources including a plurality of sources of oscillatory energy of fixed frequency, there being one of said last named sources for each of said first named sources with the frequency of the last named sources equal to the frequency desired for the corresponding first named source, switching means for coupling each of said last named sources to that one of the modulators to which its corresponding first named source is coupled, and a meter connected to each of the last named tube modulators for indicating tube current intensity.

2. In a multiplex signalling system, in combination, a plurality of signal sources, a source of oscillatory energy, the frequency of which may be shifted, for each signal source, a plurality of sources of oscillatory energy of substantially fixed frequency, there being one of said last named sources for each of said first named sources, the frequency of the sources of substantially fixed frequency being equal to the frequency at which it is desired to operate the corresponding first named source, the frequency of which is to be shifted, a reactance tube modulator associated with each signal source and the source of oscillatory energy therefor for shifting the frequency of the respective source of oscillatory energy in accordance with signals, a separate carrier suppressor modulator coupled to each of said first named sources, a main source of oscillatory energy of substantially fixed carrier wave frequency coupled to all of said carrier suppressor modulators, means for connecting the appropriate source of substantially fixed frequency to each carrier suppressor modulator for calibration purposes, and utilization circuits coupled to the carrier suppressor modulators.

3. In a multiplex signalling system, in combination, a plurality of signal sources, a source of oscillations, the frequency of which may be shifted, for each signal source, separate modulating means coupled to each signal source and the corresponding source of oscillations for shifting the frequency thereof in accordance with signals, a modulator coupled to the output of each of said sources, a source of oscillatory energy of relatively high and substantially fixed frequency coupled to all of said modulators, a utilization circuit coupled to each of said modulators, and means for monitoring said first-named sources including a plurality of sources of oscillatory energy of fixed frequency, there being one of said last-named sources for each of said first-named sources with the frequency of the last-named sources equal to the frequency desired for the corresponding first-named source, and means for connecting each of said last-named sources to that one of the modulators to which its corresponding first-named source is coupled for calibration purposes.

HALLAN E. GOLDSTINE.

REFERENCES CITED

The following references are of record in the file of this patent:

UNITED STATES PATENTS

| Number | Name | Date |
|---|---|---|
| 2,075,071 | Usselman | Mar. 30, 1937 |
| 2,145,138 | Saylor | Jan. 24, 1939 |
| 2,233,183 | Roder | Feb. 25, 1941 |
| 2,241,078 | Vreeland | May 6, 1941 |
| 2,298,409 | Peterson | Oct. 13, 1942 |